Patented Nov. 7, 1950

2,529,444

UNITED STATES PATENT OFFICE 2,529,444

METALIZED ORTHO-HYDROXY, ORTHO AMINO MONOAZO DYESTUFFS

Heinrich H. Bestehorn, Easton, Pa., and Jack F. Morgan, Phillipsburg, N. J., assignors to General Aniline & Film Corporation, New York, N. Y., a corporation of Delaware No Drawing. Application December 3, 1947, Serial No. 789,557

2 Claims. (Cl. 260—149)

This invention relates to new metallized ortho-hydroxy, ortho-amino monoazo dyestuffs, which dyestuffs are capable of dyeing nylon (linear polyamide) in deep shades.

Apart from the qualities of the dyeing, it is known that nylon may be dyed with most dyestuffs which dye wool. Among such, the metallized, water-soluble, acid, monoazo dyestuffs have been recommended for the purpose. However, as it is also known, these dyestuffs have certain drawbacks for the dyeing of nylon, the dyeing being not as deep as might be desired and of limited fastness to light and washing.

We have now found a group of new metallized ortho-hydroxy, ortho-amino monoazo compounds which are outstanding in their properties as dyestuffs for nylon. The new compounds are free from sulfonic acid groups and are further characterized by containing a single carboxy group, which group is located in the coupling component in non-ortho position to the azo bridge, i. e., in non-chelating position. The new compounds have the probable general formula:

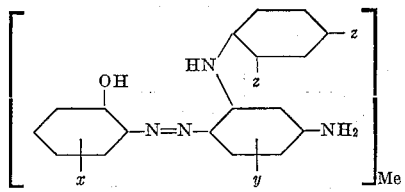

wherein $x$ is hydrogen or an alkyl, alkoxy, halogen or nitro group, $y$ is hydrogen or an alkyl, alkoxy or halogen group, $z$ is hydrogen or the carboxy group and is only once the carboxy group, and Me is a metal in complex combination with the azo bridge, which metal may be chromium, copper, cobalt or nickel.

The new dyestuffs are capable of dyeing nylon in deep shades of excellent fastness to light and washing, the carboxy group promoting affinity of the dyestuffs for nylon. They are not as soluble in water as the known metallized acid monoazo dyestuffs carrying a sulfonic acid group, yet their solubility is sufficient such that no dispersion is necessary for their application to the fiber. At higher temperatures their solubility is greatly increased.

In contradistinction to the aforementioned metallized acid monoazo dyestuffs carrying a sulfonic acid group, the new dyestuffs have excellent build-up properties for nylon and are generally superior thereto in the wash-fastness of the nylon dyeings. The new dyestuffs are in the same respects superior to the unsulfonated metallized monoazo dyestuffs which, in the one instance, contain a chelated carboxy group and, in the other, a plurality of carboxy groups but none in chelation. They are further distinguished from the aforementioned dyestuffs containing a chelated carboxy group in possessing better stability in acid bath and better exhaust. They are, moreover, similar enough in their dyeing properties to the dyestuffs now used in the trade to allow dyeings to be made on nylon with a mixture of the old with the new dyestuffs.

The new compounds may be prepared in the way known for the manufacture of metallized orthohydroxy, orthoamino monoazo dyestuffs. An unsulfonated orthoaminophenol, unsubstituted, or substituted in the nucleus by an alkyl, e. g., methyl, ethyl, an alkoxy, e. g., methoxy, ethoxy, a halogen, e. g., chlorine, or a nitro group, is diazotized and coupled in neutral or weakly acid medium with an N-(3-aminophenyl)-ortho or para aminobenzoic acid. Suitable ortho-aminophenol compounds for the diazo component of the dyestuffs which are, for example, 2-aminophenol, 1-methyl-2-hydroxy-3-amino-benzene, 1-methoxy-3-hydroxy-4-aminobenzene, 1-ethoxy-3-hydroxy-4-aminobenzene, 4-chloro-2-aminophenol, 4,6-dichloro-2-aminophenol, 4-nitro-6-chloro-2-aminophenol, 4-nitro-2-aminophenol, 4,6-dinitro-2-aminophenol, and the like.

Diamino compounds suitable as coupling components for the dyestuffs are, for example, N-(3'-aminophenyl)-anthranilic acid and the N-(alkyl, alkoxy and halogen nuclear substituted m-aminophenyl)-ortho and para-aminobenzoic acids, such as, N-(4'-methyl-3'-aminophenyl)-o-aminobenzoic acid, N-(2'-methyl-3'-aminophenyl)-p-aminobenzoic acid, N-(3'-methyl-5'-aminophenyl)-o-aminobenzoic acid, N-(2'-ethyl-3'-aminophenyl)-o-aminobenzoic acid, N-(4'-ethyl-3'-aminophenyl)-p-aminobenzoic acid, N-(2',4'-dimethyl-3'-aminophenyl) - o - aminobenzoic acid, N-(3',4'-dimethyl-5'-aminophenyl)-p-aminobenzoic acid, N-(4'-methoxy-3'-aminophenyl)-o-aminobenzoic acids, N-(3'-methoxy-5'-aminophenyl)-p-aminobenzoic acid, N-(4'-ethoxy-3'-aminophenyl) - o - aminobenzoic acid, N - (3'-ethoxy-5'-aminophenyl) -o-aminobenzoic acid, N-(2'-chloro-3'-aminophenyl) - o - aminobenzoic acid, N-(4'-chloro-3'-aminophenyl)-p-aminobenzoic acid, N - (3' - chloro-5'-aminophenyl)-o-aminobenzoic acid and the like. The coupling components mentioned above can be prepared by condensing in conventional manner the corresponding substituted phenylene diamine with o-chlorobenzoic acid and p-chlorobenzoic acid.

Metallization of the ortho-hydroxy, ortho-amino monoazo dyestuffs can be carried out by any of the methods known in the art. Depending upon the metal employed and the constitution of the dyestuff, it may be accomplished in alkaline, neutral or acid medium. While we prefer to carry out the metallization in an aqueous medium, it can also be effected in an organic solvent, as for example, alcohol, or in mixtures of such solvents with one another or with water.

The dyeing of nylon with the new compounds can be carried out in a neutral or preferably a slightly acid bath. The dyeing can be carried out at temperatures in the dyebath of about 190° F. to the boiling point. For acidification of the dyebath there can be used, acetic, formic and the like acids. Advantageously, substances which in aqueous solution dissociate on heating to liberate free acid, e. g., ammonium thiocyanate, diethyl tartrate and the like, can also be employed for the acidification of the dyebath. A specific illustration of the mode of dyeing nylon with the new dyestuffs is as follows. A solution of one of the new dyestuffs is prepared by heating to the boiling point 0.15 part of dyestuff with 300 parts of water containing a suitable surface active agent, e. g., approximately 0.1% of the oleic acid amide of methyl taurine, sodium salt. Five parts of nylon is entered into the hot dyebath and heating continued. After 15 minutes, 5 parts of 1% acetic acid solution is added and a like amount after another 15 minutes, the bath being slightly acid after these additions. After about 1 hour total heating time the nylon is removed from the dyebath, rinsed in warm water, and soaped by immersing it in a hot solution of 5 parts of a 10% green soap solution in 300 parts of water. The dyed nylon is again rinsed and then dried and conditioned in the usual manner.

The invention is further illustrated by the following specific examples to which, however, it is not intended that it be limited.

*Example*

15.4 grams of 4-nitro-2-aminophenol is dissolved in 300 ml. of water and 25 ml. of conc. hydrochloric acid, cooled and diazotized in the usual way by treatment with 6.9 grams of sodium nitrite as 30% solution. The diazo suspension is poured into a solution of 23 grams of N-(3-aminophenyl) anthranilic acid dissolved in 800 ml. of water and 12 ml. of conc. hydrochloric acid. Sodium acetate as 20% solution is then added until the mixture is nearly neutral to Congo red paper. After stirring until the coupling reaction is complete, the monoazo dye is removed by filtration. The paste is resludged in 700 ml. of water and 150–200 ml. of conc. ammonium hydroxide, stirred a few minutes, and treated with 27 grams of nickelous sulfate crystals dissolved in 200 ml. of water. After stirring for 4 hours at a temperature of 50–60° C., the nickel dye is removed by filtration, dried and ground to a fine powder. It dyes nylon from acid bath a brown shade and has the probable formula:

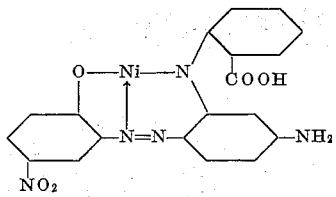

The copper and cobalt metal complexes of the dyestuff are obtained by substituting for the nickelous sulfate an equivalent amount of copper sulfate and cobaltous chloride, respectively. The chromium metal complex may be obtained by resludging the dye paste in 700 ml. water with chromium formate and heating at 135° C. in a pressure vessel for 4 hours.

We claim:

1. A metallized ortho-hydroxy-ortho-amino-monoazo dyestuff of the formula:

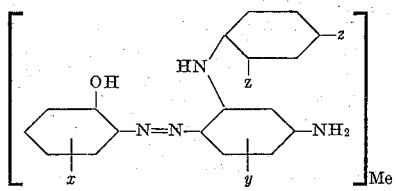

wherein $x$ is selected from the group consisting of hydrogen and the alkyl, alkoxy, halogen and nitro radicals, $y$ is selected from the group consisting of hydrogen and the alkyl, alkoxy and halogen radicals, one $z$ is hydrogen and the other $z$ is a carboxy radical, and Me is a metal in complex combination with the azo bridge selected from the group consisting of chromium, copper, cobalt and nickel.

2. The nickel ortho-hydroxy, ortho-amino monoazo dyestuff of the formula:

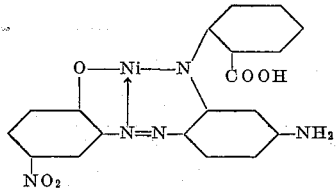

HEINRICH H. BESTEHORN.
JACK F. MORGAN.

REFERENCES CITED

The following references are of record in the file of this patent:

UNITED STATES PATENTS

| Number | Name | Date |
|---|---|---|
| 2,045,090 | Lange | June 23, 1936 |
| 2,117,745 | Reddelien et al. | May 17, 1938 |
| 2,277,551 | Kirst | Mar. 24, 1942 |